United States Patent [19]
Jadav et al.

[11] Patent Number: 6,128,762
[45] Date of Patent: Oct. 3, 2000

[54] UPDATING AND READING DATA AND PARITY BLOCKS IN A SHARED DISK SYSTEM WITH REQUEST FORWARDING

[75] Inventors: Divyesh Jadav, Campbell; Jaishankar Moothedath Menon, San Jose, both of Calif.

[73] Assignee: International Business Machines Corporation, Armonk, N.Y.

[21] Appl. No.: 09/128,754

[22] Filed: Aug. 4, 1998

[51] Int. Cl.$^7$ ................................................. G11C 29/00
[52] U.S. Cl. ..................... 714/766; 714/6; 714/770; 714/805; 711/114
[58] Field of Search ................................. 714/766–773, 714/6, 7, 5, 805; 711/114, 120, 161, 113, 155, 162

[56] References Cited

U.S. PATENT DOCUMENTS

| | | | |
|---|---|---|---|
| 5,208,813 | 5/1993 | Stallmo | 714/7 |
| 5,301,297 | 4/1994 | Menon et al. | 711/114 |
| 5,373,512 | 12/1994 | Brady | 714/767 |
| 5,375,128 | 12/1994 | Menon et al. | 714/770 |
| 5,437,022 | 7/1995 | Beardsley et al. | 714/6 |
| 5,490,248 | 2/1996 | Dan et al. | 714/6 |
| 5,499,337 | 3/1996 | Gordon | 714/6 |
| 5,526,482 | 6/1996 | Stallmo et al. | 714/6 |
| 5,530,830 | 6/1996 | Iwasaki et al. | 711/114 |
| 5,530,948 | 6/1996 | Islam | 714/6 |
| 5,572,660 | 11/1996 | Jones | 714/6 |
| 5,574,882 | 11/1996 | Menon et al. | 711/114 |
| 5,636,359 | 6/1997 | Beardsley et al. | 711/122 |
| 5,640,530 | 6/1997 | Beardsley et al. | 711/113 |
| 5,664,187 | 9/1997 | Burkes et al. | 707/205 |
| 5,787,460 | 7/1998 | Yashiro et al. | 711/114 |
| 5,848,229 | 12/1998 | Morita | 714/7 |

OTHER PUBLICATIONS

Cao, P. et al., "The TickerTAIP Parallel RAID Architecture", *ACM Transactions on Computer Systems*, vol. 12, No. 3, pp. 236–269, (Aug. 1994).

Chen, P. et al., "RAID: High–Performance, Reliable Secondary Storage", *ACM Computing Surveys*, vol. 26, No. 2, pp. 145–185, (Jun. 1994).
IBM Brochure, "SSA RAID Adapter for PC Servers", pp. 1–2, ©International Business Machines Corporation 1996.
IBM Manual, "IBM PC ServeRAID Adapter –84H7117 Installation Instructions and User's Guide", 77 pages, First Edition (Jan. 1997).
IBM Brochure, "3527 SSA Storage Subsystem for PC Servers", pp. 1–2, ©International Business Machines Corporation 1997.
IBM Brochure, "IBM PC ServeRAID Adds Two New Features", *IBM Personal computing solutions*, 12 pages (Dec. 16, 1997).
IBM Brochure, "IBM PC Server 704", *IBM Product Summaries, Personal Computing in Canada*, pp. 1–6, Last Published Jan. 16, 1998.
IBM Brochure, "SSA RAID Adapter for PCI", *IBM Storage*, pp. 1–5 (Jan. 16, 1998).
IBM Brochure, Serial Storage Architecture (SSA), *IBM Storage*, pp. 1–2 (Jan. 16, 1998).

(List continued on next page.)

*Primary Examiner*—Emmanuel L. Moise
*Attorney, Agent, or Firm*—Altera Law Group, LLC

[57] ABSTRACT

A system and method for updating data. A first processing unit, such as an adaptor, receives a data update to a data block in a first storage device, such as a hard disk drive. Parity data for the data block is maintained in a second storage device, e.g., another hard disk drive. A parity group is comprised of the data block and corresponding parity data. The first processing unit determines whether the first processing unit controls access to the parity group, i.e., the state of lock ownership. The first processing unit transmits the data update to a second processing unit after determining that the first processing unit does not control access to the parity group. The second processing unit, another adaptor, performs an update after receiving the data update from the first processing unit. The first processing unit performs an update after determining that the first processing unit controls access to the parity group.

25 Claims, 4 Drawing Sheets

OTHER PUBLICATIONS

IBM Spec Sheet, "PC Server Serial Storage Architecture (SSA) RAID Adapter Spec Sheet", *IBM Personal Computing, Canada*, page 1, Last Published Nov. 1, 1998.

Hewlett Packard Brochure, "Dynamic RAID Technology From Hewlett–Packard Addresses Issues in Current High Availability", *Hewlett Packard, Enterprise Storage Solutions Division*, pp. 1–6 (Revised Apr. 1997).

Hewlett Packard Brochure, "What are Disk Arrays?", *Information Storage*, pp. 1–11 (Jan. 15, 1998).

Judd, I., "Serial Storage Architecture", *IBM Journal of Research & Development*, vol. 40, No. 6 –Nontopical issue, pp. 1–14 (Jan. 16, 1998).

Menon, J. et al., "Algorithms for Software and Low–cost Hardware RAIDs", *IEEE*, pp. 411–418 (1995).

Menon, J., "Performance of RAID5 Disk Arrays with Read and Write Caching", *Distributed and Parallel Databases*, vol. 2, pp. 261–293 (1994).

Menon, J. et al., "The Architecture of a Fault–Tolerant Cached RAID Controller", *Computer Science, Research Report*, pp. 1–28 (Jan. 22, 1993).

MYLEX Manual "DAC960SX Family User Guide, Ultra–SCSI to Ultra–SCSI RAID Controllers DAC960SX and DAC960SXI", Manual Version 1.0, Part Number 771975–D01, *Mylex*, ©Copyright 1997 Mylex Corporation.

Patterson, D. et al., "A Case for Redundant Arrays of Inexpensive Disks (RAID)", *ACM*, pp. 109–116 (1988).

Riegel, J. et al., "Performance of Recovery Time Improvement Algorithms for Software RAIDs", *IEEE*, pp. 56–65 (1996).

UPDATING AND READING DATA AND PARITY BLOCKS IN A SHARED DISK SYSTEM WITH REQUEST FORWARDING

CROSS-REFERENCE TO RELATED APPLICATIONS

This application is related to the following co-pending and commonly-assigned patent applications, all of which are filed on the same date herewith, and all of which are incorporated herein by reference in their entirety:

"Distributed Storage System Using Front-End And Back-End Locking," by Jai Menon, Divyesh Jadav, Kal Voruganti, Ser. No. 09/129/004, attorney docket no. AM9-98-007;

"System for Updating Data in a Multi-Adaptor Environment," by Jai Menon, Divyesh Jadav, Deepak Kenchammana-Hosekote, Ser. No. 09/128,574, attorney docket no. AM9-98-008;

"System For Changing The Parity Structure Of A Raid Array," by Jai Menon, Divyesh Jadav, Deepak Kenchammana-Hosekote, Serial No. 09/129,017, attorney docket no. AM9-98-009;

"Updating And Reading Data And Parity Blocks In A Shared Disk System," by Jai Menon, Serial No. 09/129,067, attorney docket no. AM9-98-010; and "Updating Data and Parity With and Without Read Caches," by Jai Menon, Serial No. 09/128,438, attorney docket no. AM9-98-011.

BACKGROUND OF THE INVENTION

1. Field of the Invention

The present invention relates to a system for updating data and parity data in a shared disk system and, in particular, to systems employing request forwarding algorithms.

2. Description of the Related Art

In Redundant Arrays of Independent Disks (RAID) systems, data files and related parity are striped across multiple disk drives. In storage subsystems which manage numerous hard disk drives as a single direct access storage device (DASD), the RAID logic is implemented in the controller of the subsystem. RAID storage methodologies have also been implemented in software for execution on a single host computer. This allows the single host computer, such as a personal computer, to implement RAID storage techniques on local hard disk drive space. Such software RAID methodologies are described in "Algorithms for Software and Low Cost Hardware RAIDs," by Jai Menon, Jeff Reigel, and Jim Wyllie, Document No. 1063-6390/95, pgs. 411–418 (IEEE 1995), which publication is incorporated herein by reference in its entirety.

One problem with the single storage subsystem is the risk of failure. Techniques have been developed to improve failback and recovery in case of failures in the hardware controller. One such failback technique is the Fast Write Technique which provides two separate controllers on different power boundaries that control the flow of data from host systems to DASDs. If one controller fails, the other controller can continue writing data to the DASD. Typically a non-volatile storage unit (NVS) is included with each separate controller, such that each NVS connected to a controller backs up the data the other controller is writing to DASD. Such failback systems employing the two-controller failsafe structure are described in U.S. Pat. Nos. 5,636,359, 5,437,022, 5,640,530, and 4,916,605, all of which are assigned to International Business Machines Corporation (IBM), the assignee of the subject application, and all of which are incorporated herein by reference in their entirety.

RAID systems can also be implemented in a parallel computing architecture in which there is no central controller. Instead, a plurality of independent controllers that control local hard disk storage devices are separate nodes that function together in parallel to implement RAID storage methodologies across the combined storage space managed by each node. The nodes are connected via a network. Parity calculations can be made at each node, and not centrally. Such parallel RAID architecture is described in "The TickerTAIP Parallel RAID Architecture," by Pei Cao, Swee Boon Lim, Shivakumar Venkatarman, and John Wilkes, published in ACM Transactions on Computer Systems, Vol. 12, No. 3, pgs. 236–269 (August, 1994), which is incorporated herein by reference in its entirety.

One challenge in shared disk systems implementing a parallel, shared disk RAID architecture is to provide a system for insuring that data is properly updated to disks in the system, that a write or update request invalidates stale data so such stale data is not returned, and that a read request returns the most current data.

SUMMARY OF THE INVENTION

Provided is an improved system and method for updating data. A first processing unit receives a data update to a data block in a first storage device. Parity data for the data block is maintained in a second storage device. A parity group is comprised of the data block and corresponding parity data. The first processing unit determines whether the first processing unit controls access to the parity group. The first processing unit transmits the data update to a second processing unit after determining that the first processing unit does not control access to the parity group. The second processing unit performs an update after receiving the data update from the first processing unit. The first processing unit performs an update after determining that the first processing unit controls access to the parity group.

Preferred embodiments provide systems and method for updating data and parity groups and at the same time minimizing network message traffic between the processing units, e.g., adaptors, in the system. Further embodiments, use messaging to keep the second adaptor informed of the parity groups being updated. In this way, if the first adaptor fails, the second adaptor can readily determine the inconsistent parity groups that need to be updated or block access to the inconsistent parity groups before recovering failed data. In still further embodiments, lock ownership of parity groups is reassigned to the adaptors that more frequently update to the parity groups. This reassignment minimizes the need to forward update requests between adaptors by transferring lock ownership of the parity group to the adaptor that more frequently updates data to the parity group. Preferred embodiments seek to balance the goals of reducing message traffic and improving failure recovery time.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Hardware and Software Environment

Figure 1:
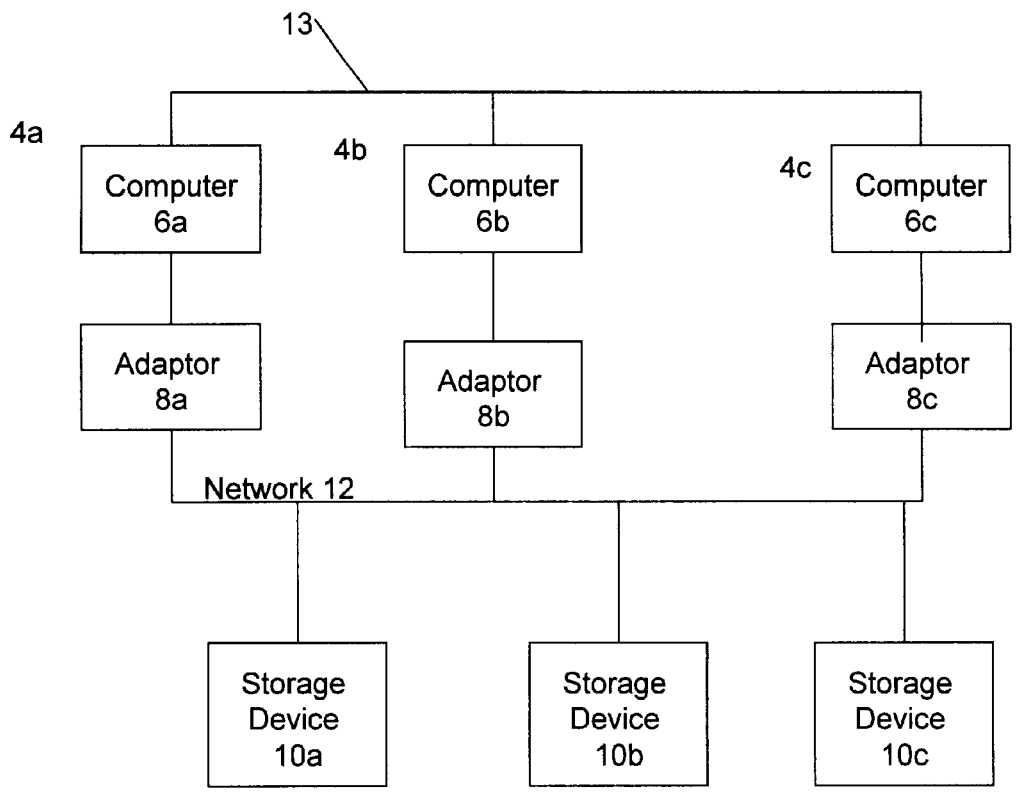
FIG. 1 illustrates a preferred hardware and software environment in which preferred embodiments of the present invention are implemented.

FIG. 1 illustrates a shared device environment comprised of nodes 4*a, b, c*. Each node includes a computer 6*a, b, c*, i.e., central processing unit, and an adaptor card 8*a, b, c*. A plurality of storage devices 10*a, b, c* interface via a network 12 to the adaptor cards 8*a, b, c* and attached computers 6*a, b, c*. The computer 6*a, b, c* may be a personal computer, workstation, mainframe, etc. The adaptor cards 8*a, b, c* interface with their respective computers 6*a, b, c* via a PC bus, such as the PCI bus, and include one or more disk interface ports, such as SCSI or Serial Storage Architecture (SSA) ports. The adaptor cards 8*a, b, c* include logic to execute the RAID algorithms. The storage devices 10*a, b, c* may be any suitable non-volatile storage device known in the art, including hard disk drives, magnetic tape, optical disks, non-volatile RAM, holographic units, etc. The nodes 4*a, b, c* and storage devices 10*a, b, c* interface via the network 12, which is preferably a high speed interconnect, such as SCSI, SSA, SNA, SAN, FDDI, etc. Additionally, the network 12 may be a SCSI or SSA bus. In further embodiments more nodes than shown may be included in the shared device system 2. Each node may include multiple adaptors, multiple processors and/or local (non-shared) storage devices.

FIG. 1 further illustrates an additional network 13 providing an additional communication line among the computers 6*a, b, c*. This additional network 13 may be comprised of any suitable network known in the art, e.g., ETHERNET, LAN, etc.

In preferred embodiments, the computers 6*a, b, c* run parallel processing software, such as the ORACLE PARALLEL SERVER™, the MICROSOFT® Wolfpack Clustering System or any other clustering software. ORACLE PARALLEL SERVER is a trademark of Oracle Corporation; MICROSOFT is a registered trademark of Microsoft Corporation. This parallel processing software allows the computers 6*a, b, c* to share storage devices 10*a, b, c* such that any node 4*a, b, c* may access any block in any of the storage devices 10*a, b, c*. This parallel architecture allows data to be distributed across different storage devices 10*a, b, c* throughout the shared device system 2. The parallel processing software, implemented in the computers 6*a, b, c*, may perform logical locking to insure that only one write request is made to a block in any of the storage devices 10*a, b, c*, at any given time and to insure that an application does not attempt to read a block being modified by another application. To perform logical locking under control of the parallel processing software, the computers 6*a, b, c* would exchange messages, data, and information via the additional network 13. The adaptors 8*a, b, c* perform physical locking.

Figure 2:
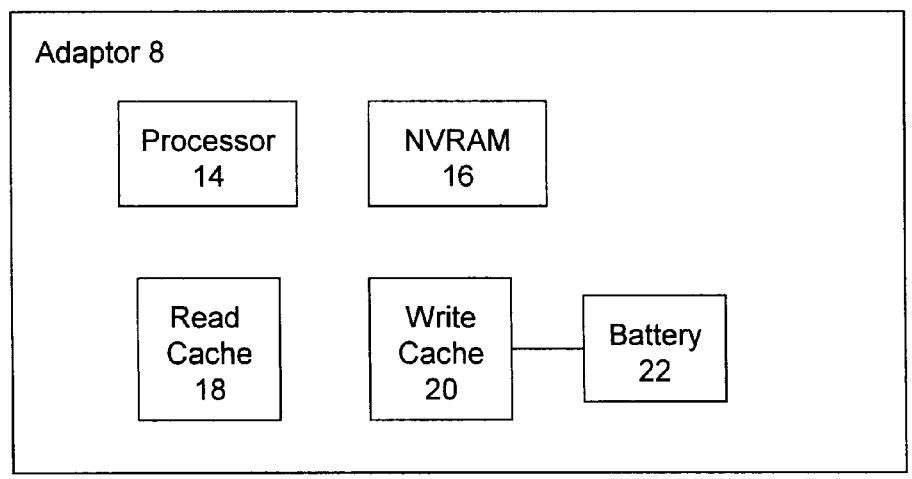
FIG. 2 illustrates a preferred hardware and software architecture of an adaptor in accordance with preferred embodiments of the present invention.

FIG. 2 illustrates a preferred embodiment of the adaptors 8*a, b, c*. Each adaptor 8*a, b, c* includes a processor 14*a, b, c*, a non-volatile RAM 16*a, b, c* for storing control information, a read cache 18*a, b, c*, and a write cache 20*a, b, c*. The read 18*a, b, c* and write 20*a, b, c* caches may be comprised of volatile memory, such as RAM, or a non-volatile memory unit, e.g., non-volatile RAM. In certain embodiments, the read cache 18*a, b, c* and write cache 20*a, b, c* may be areas within the same memory device or located within separate memory devices. In further embodiments, there may be no read 18*a, b, c* and/or write 20*a, b, c* caches. In preferred embodiments, the write caches 20*a, b, c* contain dirty blocks, which is data intended for a block in the storage device 10*a, b, c* that is more recent than the block actually maintained in the storage device 10*a, b, c*. Once the data is written from the write cache 20*a, b, c* to the storage device 10*a, b, c*, the copy of the data in the cache is "clean." Because the write cache 20*a, b, c* only maintains "dirty" blocks, the clean copy in the cache after the update is considered to be in the read cache 18*a, b, c*, not the write cache 10*a, b, c* anymore. The components of the adaptors 8*a, b, c* may be implemented as PC cards such the PC ServeRAID SCSI adaptor from IBM.

Alternatively, components and functionality of the adaptors 8*a, b, c* could be implemented in the computers 6*a, b, c*.

In certain embodiments, the read cache 18*a, b, c* may be implemented in a volatile memory device, e.g., DRAM, RAM, etc., and the write cache 20*a, b, c* may be attached to a battery 22 which makes the write cache 20*a, b, c* a non-volatile memory device. In such case, an update to a block is initially written in both the RAM (read cache) and the battery 22 backed up write cache 20*a, b, c*. Once the dirty data is destaged to the storage device 10*a, b, c*, the copy from the write cache 20*a, b, c* is marked as invalid for later removal, leaving only the clean copy in the RAM, i.e., read cache. In alternative embodiments, the dirty data may be sent to all other adaptors in the system to invalidate any stale data in their caches. In embodiments with only a single memory device for the read 18*a, b, c* and write 20*a, b, c* caches, the data is considered to be in the write cache 20*a, b, c* prior to destaging and in the read cache 18*a, b, c* after destaging even though the data remains in the same memory device.

In preferred embodiments, the adaptors 8*a, b, c* must satisfy all of the following correctness conditions:

(1) a request to write a data block from adaptor 8*a* simultaneous with a request to write another data block from adaptor 8*b*, where the two data blocks have the same parity block, causes a correct parity update in the sequence which the updates were made;

(2) a write request through one adaptor 8*a* for a block in the read 18*b* or write 20*b* cache at another adaptor 8*b* causes the invalidation of data in cache 18*b* or 20*b* so that stale data is not returned to a subsequent read request or later destaged to the storage device 10*b* from old data in caches 18*b*, 20*b*; and (3) a read request through one adaptor 8*a* for a block cached at adaptor 8*b* in read 18*b* or write 20*b* cache, returns the latest version of the data block from adaptor 8*b*.

Those skilled in the art will recognize that alternative conditions to the three mentioned above may also be satisfied.

Parity in a RAID Environment

Figure 3A:
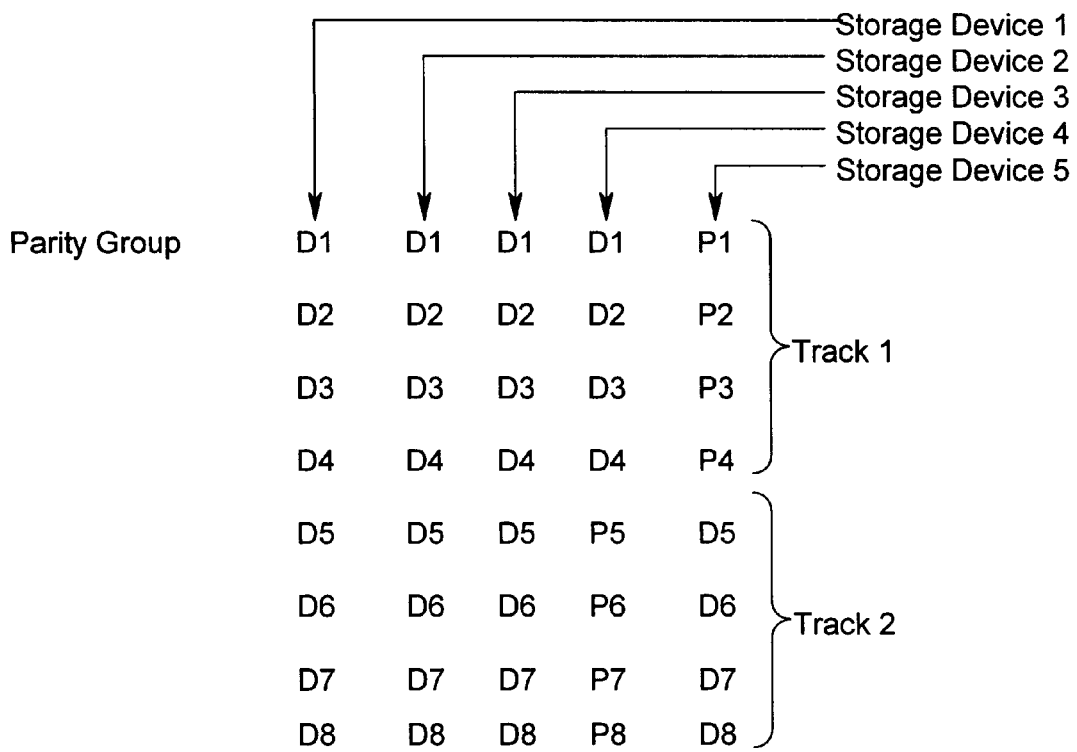
FIGS. 3*a* and *b* illustrate embodiments of how data and parity blocks are arranged on storage devices.

FIG. 3a illustrates a 4+P RAID disk array in which a parity block $P_i$ protects four data blocks $D_i$ in four storage devices. Each vertical column represents a storage device. A parity group is a row in the illustration of FIG. 3a that consists of four data blocks $D_i$, one in each storage device, and a parity block $P_i$ maintaining parity information for the four data blocks $D_i$. A parity value $P_i$ is the exclusive OR of the data blocks $D_i$ in the same parity group of a given i. If a disk fails, then the data can be recreated by processing the parity block ($P_i$) and the remaining data blocks $D_i$ for the parity group. FIG. 3a further shows the rotation of parity in that parity blocks $P_5$ through $P_8$ are on a different disk, storage device 4, than the previous parity blocks which are on storage device 5.

In preferred embodiments, a parity block can be updated with the following exclusive OR operation, where the new parity $(P_i')=$(old data $(D_i)$ XOR new data $(D_i')$ XOR old parity $(P_i)$.

Figure 3B:
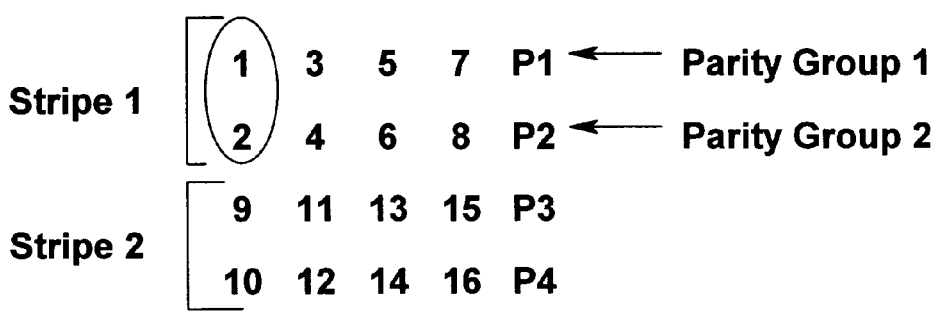

In certain embodiments, data may be stored in "stripe units" on the storage devices. FIG. 3b illustrates a "stripe unit" of data. A stripe unit consists of multiple consecutive blocks of data on a storage device. The "stripe unit" shown in FIG. 3b has two consecutive blocks of data, blocks 1 and 2. A "stripe" consists of multiple stripe units. The "stripe" shown in FIG. 3b has five stripe units. In the exemplar of FIG. 3b, a stripe unit includes blocks from two parity groups throughout each storage device. In alternative embodiments, a "stripe unit" and "stripe" could be defined in alternative manners, e.g., including more than two blocks of data, depending on the number of storage devices and parity groups.

In alternative embodiments, other parity schemes may be utilized, such as mirrored RAID, bit-interleaved parity, block-interleaved distributed-parity or P+Q redundancy, etc. These various RAID schemes are discussed in "RAID: High-Performance, Reliable Secondary Storage," by Peter M. Chen, Edward K. Lee, Garth A. Gibson, Randy H. Katz, and David A. Patterson, published in ACM Computing Surveys, Vol. 26, No. 2, pgs. 145–185 (June, 1994), which publication is incorporated herein by reference in its entirety.

Front End And Back End Locking Schemes

A write cache 20a, b, c in an adaptor 8a, b, c that stores data that is more recent than the version of that data in the corresponding block in the storage device 10a, b, c is a "dirty block." When data is first updated from D to D', the dirty data D' is stored in the read cache 18a, b, c and in the battery backed-up write cache 20a, b, c. Once the dirty data is destaged from the write cache 20a, b, c to the storage device 10a, b, c, the read cache 18a, b, c copy is referred to as a "clean block." After destaging, any backup copy of the dirty data in the write cache 20a, b, c may be eliminated, leaving only a "clean" copy of the destaged "dirty data" in the read cache 18a.

Data is transferred to a node 4a, b, c for storage in the attached storage device 10a, b, c in two phases, a front-end phase and a back-end phase. A front-end lock refers to a state associated with a block of data to which a read or data update request is directed, whether a version of that block of data is located in the storage device 10a, b, c, read cache 18a, b, c, or write cache 20a, b, c. A back-end lock refers to a state associated with a data block maintaining parity data or involved in a destaging operation.

In the front-end phase, data is written to the write cache 20a, b, c, but not moved to the attached storage device 10a, b, c. In the back-end phase, data is destaged from the write cache 20a, b, c to the attached storage device 10a, b, c. The adaptors 8a, b, c at each node 4a, b, c include logic, e.g., software and/or hardware, to issue locking commands to control access to the data block represented by the lock unit, whether the most recent version of that data block is maintained in the storage devices 10a, b, c, read cache 18a, b, c, or write cache 20a, b, c. An adaptor 8a, b, c cannot access data unless that adaptor controls or owns the lock unit for that data block. Locking commands to control access to data insure that stale data at any adaptor 8a, b, c is invalidated and that a read request gets the most current copy of data, wherever that most current copy of data may reside in the shared device system 2. Further, the back-end phase of locking insures that updates of parity blocks on the disk drives are synchronized. As discussed, parity data is stored throughout the shared device system 2, such that a storage device 10a, b, c may include parity for data maintained throughout the shared device system 2.

A lock state applies to one or more data blocks referred to as a locking unit. A version of data maintained in the storage devices 10a, b, c may be maintained in the read 18 or write 20 caches. A lock state could apply to a data block lock unit, whether that data block is maintained only in the storage device 10a, b, c and versions of the lock unit data block maintained in the read 18 or write 20 cache. For front-end locks, the locking unit may be a data block or any other grouping of data. For backend locks that apply to the parity data, the locking unit may be a parity group. In preferred embodiments, the front-end and back-end locking schemes are separate and do not conflict. Thus, parity updates can be done independently of data updates. In alternative embodiments, a unified locking scheme may be used. In a unified locking scheme, parity data or data in the write cache 20a, b, c cannot be updated if another adaptor 8b is involved in a destage operation.

In the front end phase, locking is used to insure that update requests invalidate stale data in the read 18a, b, c or write 20a, b, c caches of other adaptors 8a, b, c and that read requests get the most current copy of data. In the back end phase, locking is used to insure that update of parity on the storage devices 10a, b, c are synchronized between different adaptors updating to the same parity block. For the front end phase, an appropriate lock unit might be a data block, stripe, or any other unit of data involved in read or write operations. For the back end phase, the lock unit might be the parity group for the unit of updated data.

In certain embodiments, only an adaptor 8a, b, c that is designated the "owner" of a lock unit may place a lock on the lock unit. Such embodiments requiring lock ownership are described in the related application "Distributed Storage System Using Front-End And Back-End Locking," attorney docket no. AM9-98-007, incorporated by reference above. In embodiments without lock ownership, access is controlled by designating two or more adaptors 8a, b, c as the "primary adaptors" for a lock unit. Only primary adaptors can access the area of the storage device 10a, b, c corresponding to the lock unit. If an adaptor other than the primary adaptor originates a request for a particular lock unit, i.e., data block or stripe, the request is forwarded to one of the primary adaptors.

Update Request Forwarding Without Read Caches

In adaptors 8a, b, c without read caches 18a, b, c, the only correctness condition that must be satisfied is that when updates are made to data blocks in the same parity group (P), updates to the parity block should be made in the same manner that the updates were made to insure correct parity calculations. In preferred embodiments, locks are obtained for parity groups before a data block in a parity group may be updated. However, in alternative embodiments, the lock may apply to a stripe or multiple stripes within multiple parity groups. In preferred embodiments, each adaptor 8a, b, c maintains information on lock ownership. In the two adaptor case, an adaptor does not need to specifically indicate what locks the other adaptor owns. The adaptor may determine the locks the other adaptor owns by examining the locks the adaptor owns and assuming that the other adaptor owns all remaining locks. The adaptors 8a, b, c may communicate via the network 12 to request lock ownership from the other adaptors.

Control messages are exchanged between adaptors to obtain locks, which allow the adaptor 8a, b, c obtaining the lock to perform I/O operations with respect to the locked unit and to keep other adaptors informed of the storage areas being updated. If the other adaptors are aware of the lock units, i.e., storage areas, being updated, then they can block access and correct the locked units being updated should the updating adaptor fail.

Figure 4:
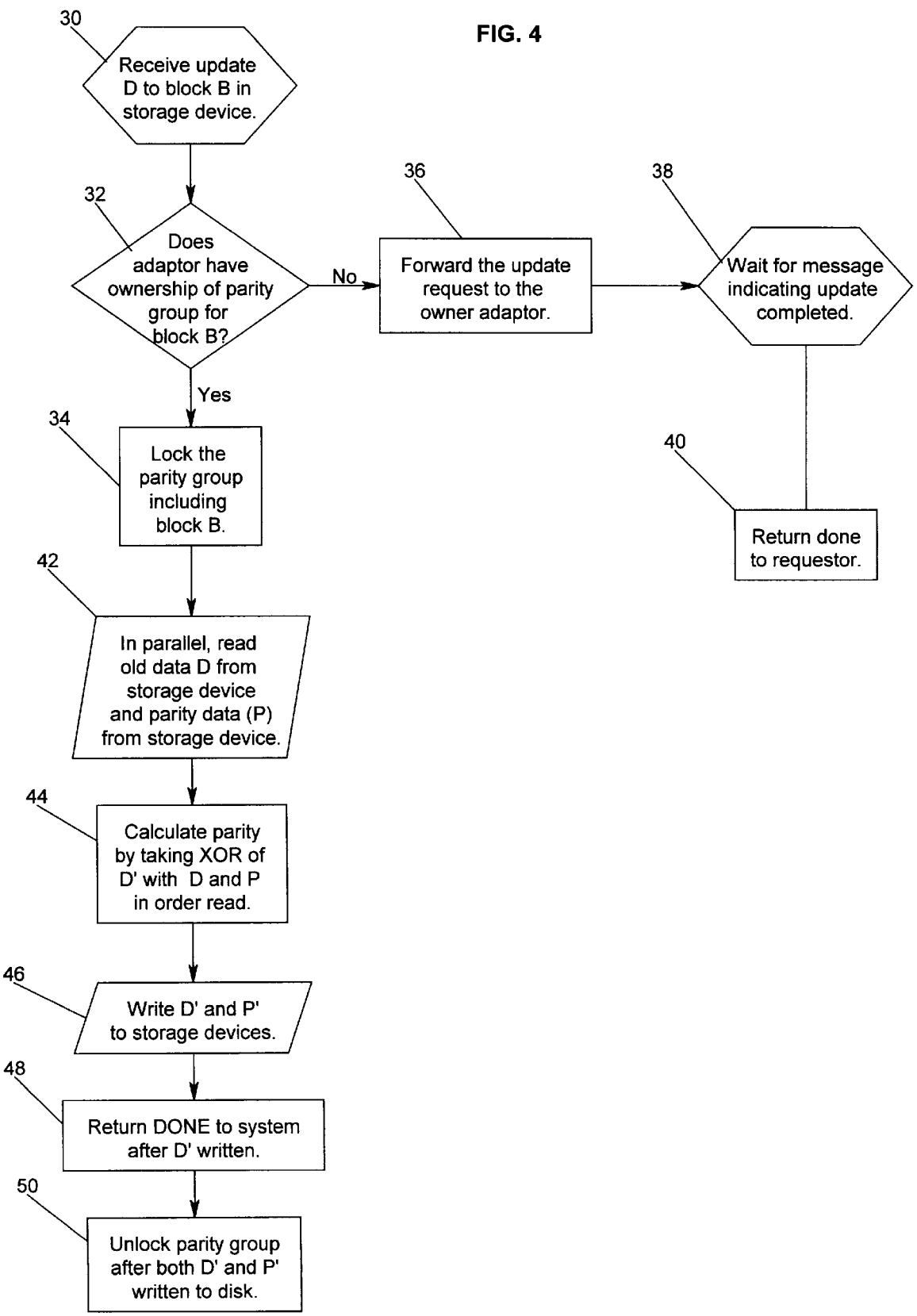
FIG. 4 illustrates logic implemented in the adaptors to update data in accordance with preferred embodiments of the present invention.

FIG. 4 illustrates logic implemented in the adaptors 8a, b, c to update old data D with update data D' in block B in a storage device, e.g., storage device 10a. The logic of FIG. 4 can be implemented in a two adaptor case or if the system includes more than two adaptors. The parity data P for the data block B being updated is in another storage device, e.g., storage device 10b. Control begins at block 30 which represents an adaptor, e.g., adaptor 8a, receiving an update D' to data D at block B. Control transfers to block 32 which represents the adaptor 10a determining whether it has ownership of the parity group including the block B to update. If so, control transfers to block 34; otherwise, control transfers to block 36. Block 36 represents the adaptor 8a forwarding the update request to the owner adaptor, e.g., adaptor 8b, to process. Control then transfers to block 38 which represents the forwarding adaptor 8a waiting for a message from the adaptor 8b indicating that the update was completed. After receiving the message that the update was completed, control transfers to block 40 which represents the adaptor 8a returning a DONE message to the requestor that requested the data, such as a device or application program.

If the adaptor 8a receiving the update request has lock ownership, control transfers to block 34 which represents the adaptor 8a locking the parity group including the block B to update. Control then transfers to block 42 which represents the adaptor 8a reading in parallel the old D from the storage device 10a and the parity data P from the storage device 10b. Control transfers to block 44 which represents the adaptor 8a calculating parity P' by taking the logical OR of D' XOR D XOR P. The adaptor 8a will start the parity calculation process as soon as it retrieves D and P from the storage devices 10a, b. Thus, the order of parity calculation depends on when the D and P are received. Control then transfers to block 46 which represents the adaptor 8a writing D' and P' to the storage devices 10a, b. Control transfers to block 48 to return DONE to system after the new data D' is written. DONE may be returned after the new data D' is written and before P' is written. At block 48, the adaptor 8a unlocks the parity group after the D' and P' are written.

The logic of FIG. 4 insures that multiple, simultaneous updates to a storage device are correctly handled, with parity being updated to insure that parity is updated in the order that updates are received. The logic of FIG. 4 can apply to the two adaptor case or the N adaptor case, wherein N>2.

In preferred embodiments, the adaptors maintain data structures indicating the ownership of parity groups. In alternative embodiments, the microcode of the adaptors may assign ownership of a set number of the parity groups to such adaptor. In such case, each adaptor knows beforehand from its microcode which parity group numbers it owns, e.g., one adaptor owns parity group numbers 1–100, all even parity groups, all odd, etc. In yet further embodiments, the adaptors may utilize an algorithm to compute whether the adaptor owns a particular parity group number. In such cases, a data structure would not be used to determine which parity groups each adaptor owns. Instead, when the adaptor receives a request to update or read from a data block in a parity group, the adaptor can determine from the microcode whether ownership of such parity group is assigned to the adaptor.

If an adaptor fails during the update algorithm of FIG. 4, the surviving adaptor, e.g., adaptor 8b, can recover by examining its data structure indicating ownership of parity groups to determine the parity groups owned by the other adaptor. In the two adaptor case, if each adaptor has lock ownership of one-half the locks, the surviving adaptor would update data and/or parity of the inconsistent parity groups whose lock ownership was owned by the failed adaptor. In alternative embodiments, the updating adaptor can message the other adaptor(s) in the system when an update begins and ends. In this way, the surviving adaptor(s) maintains information on which parity groups were in the process of being updated when the updating adaptor failed. This minimizes the number of parity groups to which access must be blocked in the event of a failure. Moreover, the time to recover failed parity groups is reduced because the messages inform the other adaptor(s) of parity groups involved in update operations, i.e., inconsistent parity groups, when the updating adaptor failed. However, algorithms requiring a message before and after an update can increase network traffic significantly as the number of adaptors in the system increases.

In alternative embodiments, when there are N adaptors, pairs of adaptors could be assigned ownership of each parity group. Update requests to a parity group are forwarded between the adaptor pairs that share ownership of the parity group. The updating adaptor would message its peer adaptor before and after update. On the failure of the updating adaptor, the peer could take over. In this way, operations in degrade and rebuild mode are improved because the surviving peer adaptor is informed exactly which groups are inconsistent and messaging is minimized because messages before and after updates need only be transmitted to the single peer adaptor, not all other N-1 adaptors in the system.

In one implementation of the request forwarding algorithm of FIG. 4, ownership of the parity groups is static and randomly assigned at initialization. In an alternative embodiment, the adaptors may alter the distribution of lock ownership of parity groups. To dynamically alter lock ownership, the adaptors, e.g., adaptors 8a, b, would each maintain a data structure indicating the parity groups to which it has lock ownership and another data structure, referred to as the "write frequency list," which orders the parity groups according to the decreasing frequency of updates performed by the adaptor on the parity group. As discussed, in alternative embodiments, adaptors 8a, b may determine lock ownership from assignments or algorithms set in the microcode of the adaptor. However, for purposes of dynamically altering lock ownership, the adaptors would have to maintain some data structure indicating lock ownership in order to indicate a reassignment of such lock ownership. An adaptor indicates an update request in the write frequency list for all parity groups, including those it owns and those owned by the other adaptor(s).

Figure 5:
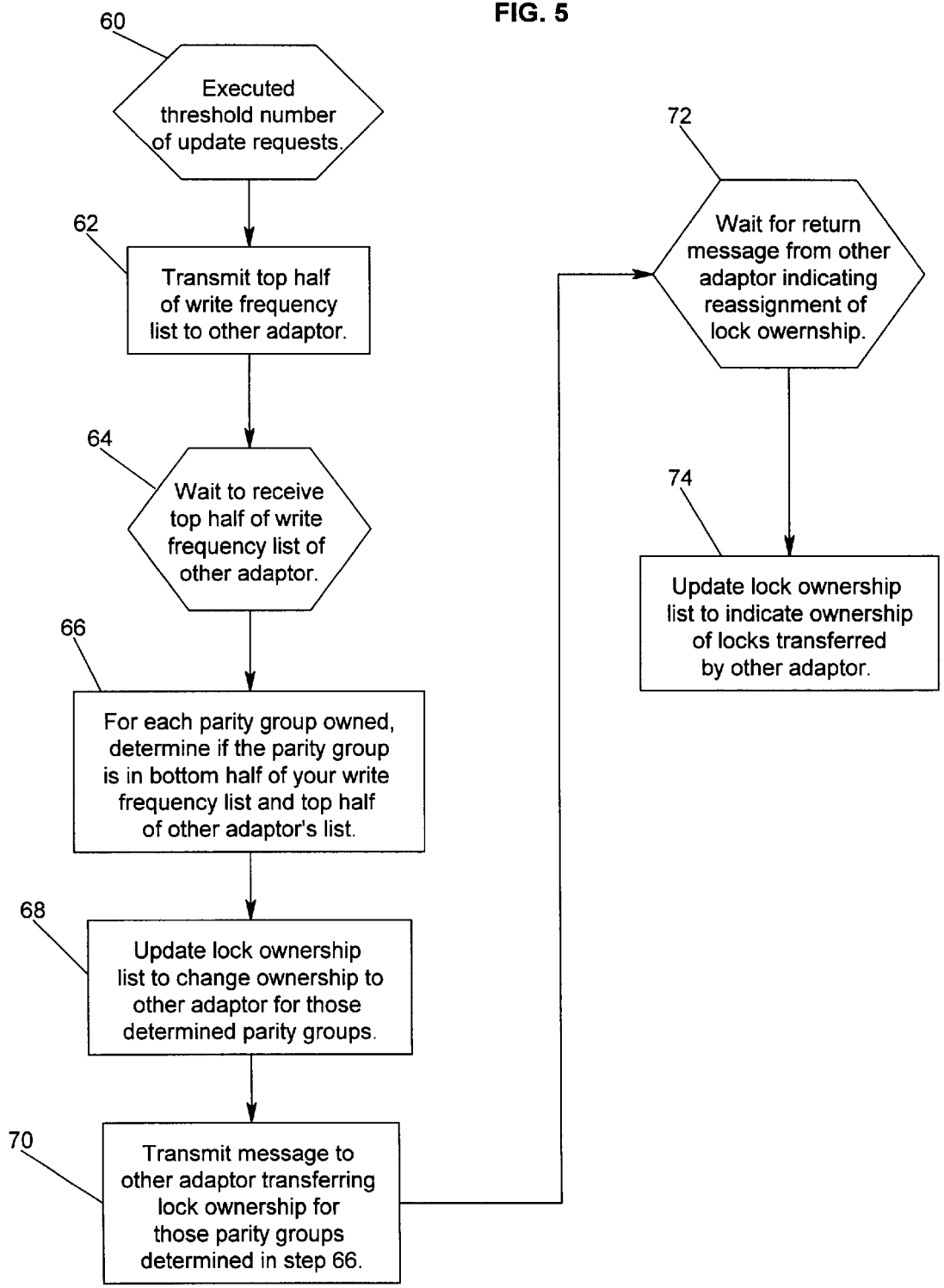
FIG. 5 illustrates logic implemented in the adaptors to reassign ownership of parity groups in accordance with preferred embodiments of the present invention.

FIG. 5 illustrates logic implemented in both adaptors, e.g., adaptors 8a, b, to dynamically reassign lock ownership using the write frequency list data structure. With respect to FIG. 5, after one of the adaptors updates a threshold number of parity groups, e.g., 100,000, both adaptors 8a, b will execute the logic of FIG. 5 at block 60. In alternative embodiments, the adaptors 8a, b may execute logic of FIG. 5 in response to some other triggering event, such as the lapse of a predetermined period of time. Control transfers to block 62 which represents each adaptor 8a, b transmitting the top half of its write frequency list to the other adaptor. As discussed, the top half of the write frequency list indicates those parity groups owned by the adaptor that the adaptor most frequently updated. Control transfers to block 64 which represents the adaptors 8a, b waiting to receive the top half of the write frequency list from the other adaptor 8a, b.

Control then transfers to block 66 which represents each adaptor 8a, b, for each parity group that adaptor owns, determining whether such parity group is in the bottom half of that adaptor's write frequency list, i.e., the adaptor has updated least frequently, and the top half of the other adaptor's write frequency list, i.e., those parity groups that the other adaptor updated more frequently. Control then transfers to block 68 which represents the adaptors altering a data structure indicating lock ownership to reassign ownership of those parity groups determined at block 66 to be in the bottom top half of that adaptor's write frequency list and the top half of the other adaptors write frequency list. Control transfers to block 70 which represents the adaptor determining the reassignment transmitting a message to the other adaptor indicating those parity groups whose lock ownership was reassigned to the other adaptor.

Control transfers to block 72 which represents the adaptor waiting for a return message from the other adaptor indicating a reassignment of lock ownership performed by the other adaptor executing the logic of blocks 64–70. Control then proceeds to block 74 which represents the adaptor updating its lock ownership list to indicate the lock ownership reassigned by the other adaptor performing steps 64–70. Thus, the logic of FIG. 5 may be executed by both adaptors simultaneously to reassign to the other adaptor ownership of their least used parity groups that are more frequently used by the other adaptor.

The dynamic lock ownership algorithm of FIG. 5 requires more memory for the parity group ownership information and write frequency lists, and additional communication bandwidth to handle lock ownership reassignment messages than the static lock ownership algorithm.

Updating Data and Parity When The Adaptors Include Read Caches

If the adaptors 8a, b, c include read caches 18a, b, c, then the algorithms should satisfy two correctness conditions: (1) when an update occurs to different blocks having the same parity block, parity is likewise updated and (2) an update request through one adaptor, e.g., adaptor 8a, which is cached at another adaptor, e.g., adaptor 8b, causes the invalidation of the cache copy at the other adaptor 8b so that the adaptor 8b does not return or destage stale data.

When read caches are involved, there are two schemes to handle read and update requests when the adaptor receiving the request is not the owner of the block to be updated or read. In the first scheme, the preferred logic of FIG. 4 is modified to handle both read and update requests. If the adaptor receiving the update or read request, e.g., adaptor 8a, is not the owner of the parity group that is the subject of the read or update request, then the read or update request is forwarded to the remote peer adaptor, e.g., adaptor 8b, to handle. If the forwarded request is an update request, the updated data is also transferred with the message. The forwarding adaptor 8a then waits for a message indicating that the read or write operation was performed. In preferred embodiments, the remote peer adaptor 8b performing the read request caches the read data in its read cache 18b. If the adaptor 8a receiving the request owns the lock, then the receiving adaptor will perform the steps 34–50 and cache any read data in its read cache 18a. In this way, data is only cached in the read cache by the adaptor performing the read operation, thus, insuring that the no adaptor 8a, b, c maintains stale data in its read cache 18a, b, c.

In another scheme, all update requests may be forwarded to the adaptor owning the parity group and all read requests may be performed locally. In such case, when update requests are performed, the updating adaptor must message the remote adaptor(s) to invalidate any data for the updated data block maintained in the remote adaptor's read cache 18a, b, c, which contains invalid data after the update.

In yet further embodiments, ownership can be dynamically reassigned as described in the logic of FIG. 5 when read caches are involved.

Updating Data and Parity When The Adaptors Include Both Read And Write Caches As discussed, a write cache 20 contains dirty blocks. When the data is updated in the storage devices 10a, b, c, the data becomes clean and is considered to be in the read cache. In this embodiment, the NVRAM 16a, b, c would maintain partial parity data of all writes, which are destaged during a destaging and parity flushing operation. Related patent application entitled "Distributed Storage System Using Front end And Back end Locking," attorney docket no. AM9-98-007, which application was incorporated herein by reference in its entirety above, describes data destaging and parity flushing operations in further detail.

In preferred embodiments with read 18a, b, c and write 20a, b, c caches, the preferred logic of FIG. 4 could be modified to handle both read and update requests. If the adaptor receiving the update or read request, e.g., adaptor 8a, is not the owner of the parity group that is the subject of the read request, the request is forwarded to the owner adaptor, e.g., adaptor 8b, to handle. If the forwarded request is an update request, the data update is also forwarding. The forwarding adaptor 8a then waits for a message indicating that the read or write operation was performed. In preferred embodiments, the adaptor 8b performing the read request caches the read data in its read cache 18b. If the adaptor 8a receiving the request owns the lock, then the receiving adaptor will perform the steps 34–50 and cache any read data in its read cache 18a. When the write cache 20a, b, c reaches a predetermined threshold of updates that have not yet been applied to the storage devices 10a, b, c, then the adaptor would perform the destage and parity flushing operations.

Scalability

To scale to N adaptors, the request forwarding algorithm of FIG. 4 can be combined with algorithms described in related applications. For instance, if there are N adaptors, ownership of each parity group can be shared by a pair of adaptors, wherein a pair of adaptors split lock ownership of the parity groups. Before forwarding an update request to the owning adaptor, the forwarding adaptor could store information indicating the data block and parity group being updated. Such data indicating the inconsistent forwarded parity group may be maintained in the NVRAM of the forwarding adaptor. The use of NVRAMs to indicate inconsistent parity groups is described in related patent application, entitled "System for Updating Data in a Multi-Adaptor Environment," Serial No. xx/xxx,xxx, attorney docket no. AM9-98-008, which application was incorporated by reference in its entirety above.

Conclusion

This concludes the description of the preferred embodiments of the invention. The following describes some alternative embodiments for accomplishing the present invention.

In preferred embodiments, adaptors 8a, b, c interface the nodes 4a, b, c to allow sharing of storage resources. The adaptors 8a, b, c were described as having specific components, such as a processor 14a, b, c, NVRAM 16a, b, c, read cache 18a, b, c, write cache 20a, b, c, and NVS unit 22a, b, c. In alternative embodiments, some or all the components of the adaptors 8a, b, c may be located elsewhere in the node 4a, b, c or share resources with the computer 6a, b, c. In yet further embodiments, there may be a central computing resource or node that monitors or controls intercommunication between the nodes 4a, b, c.

In further embodiments, the adaptors 8a, b, c may share NVRAM 16a, b, c maintaining information on inconsistent parity groups across adaptors 8a, b, c. In yet further embodiments, some or all of the parity calculations, e.g., XOR operations, may be performed by the storage devices 10a, b, c instead of the adaptors 8a, b, c.

The write cache 20a, b, c and read cache 18a, b, c may be memory locations within a single memory device or memory locations within a separate memory device, comprised of any suitable memory device known in the art, including volatile and non-volatile memory devices.

The logic of FIGS. 4 and 5 is for illustrative purposes. The logic may be implemented in memory areas of the adaptors 8a, b, c, e.g., a ROM embedded in the adaptor. Alternatively, the logic may be implemented in the computers 6a, b, c, which in turn control the adaptors 8a, b, c to update and read a block of data in a storage device 10a, b, c. Additional or alternative steps may be performed in addition to those illustrated in the logic. Further, the order of the steps in the preferred logic may also vary.

Updated parity P' was calculated by taking the exclusive OR of the old data D, new data D', and old parity P. However, those skilled in the art will appreciate that alternative methods known in the art for determining parity may be used in addition to the exclusive or operation described herein.

The preferred embodiments may be implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more computer programs and data files accessible from one or more computer-readable devices, carriers, or media, such as a magnetic storage media, "floppy disk," CD-ROM, a file server providing access to the programs via a network transmission line, holographic unit, etc. Of course, those skilled in the art will recognize many modifications may be made to this configuration without departing from the scope of the present invention.

In summary, preferred embodiments disclose a system for updating data. A first processing unit receives a data update to a data block in a first storage device. Parity data for the data block is maintained in a second storage device. A parity group is comprised of the data block and corresponding parity data. The first processing unit determines whether the first processing unit controls access to the parity group. The first processing unit transmits the data update to a second processing unit after determining that the first processing unit does not control access to the parity group. The second processing unit performs an update after receiving the data update from the first processing unit. The first processing unit performs an update after determining that the first processing unit controls access to the parity group.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for updating data, comprising the steps of:

receiving, with a first processing unit, a data update to a data block in a first storage device, wherein parity data for the data block is maintained in a second storage device, and wherein a parity group is comprised of the data block and corresponding parity data;

determining, with the first processing unit, whether the first processing unit controls access to the parity group;

transmitting, with the first processing unit, the data update to a second processing unit after determining that the first processing unit does not control access to the parity group;

performing an update, with the second processing unit, after receiving the data update from the first processing unit; and performing an update, with the first processing unit, after determining that the first processing unit controls access to the parity group.

2. The method of claim 1, wherein the step of performing an update comprises the steps of:

indicating that the processing unit that does not control access to the parity group cannot access the parity group;

reading the current data at the data block and the parity data for the data block;

determining new parity data from the data update, the data at the data block, and the parity data; and writing the data update to the data block in the first storage device and the new parity data to the second storage device.

3. The method of claim 1, wherein the step of determining whether the first processing unit controls access to the parity group comprises the first processing unit performing one of the operations that is a member of the set of operations comprising:

processing a data structure indicating an assignment of control of parity groups to the first processing unit;

processing microcode providing an assignment of control of parity groups to the first processing unit; and processing an algorithm to compute the parity groups that the first processing unit controls.

4. The method of claim 1, wherein the step of the first processing unit performing an update further comprises the steps of:

sending a first message to the second processing unit indicating the parity group to be updated after receiving the update;

sending a second message to the second processing unit indicating that the parity group was updated after writing the data update to the data block and the new parity data to the second storage device; and processing, with the second processing unit, at least one of the first message and the second message to determine the parity groups not updated if the first processing unit fails.

5. The method of claim 1, wherein the first processing unit controls access to a first set of parity groups and the second processing unit controls access to a second set of parity groups, wherein a first data structure indicates a frequency of updates to the parity groups by the first processing unit and a second data structure indicates a frequency of updates to the parity groups by the second processing unit, further comprising the steps of:

processing the first and second data structures to determine those parity groups least frequently used by the first processing unit and most frequently used by the second processing unit;

processing the first and second data structures to determine those parity groups least frequently used by the second processing unit and most frequently used by the first processing unit;

reassigning control of parity groups that the first processing unit controls that are determined to be least frequently used by the first processing unit and most frequently used by the second processing unit to the second processing unit; and reassigning control of parity groups that the second processing unit controls that are determined to be least frequently used by the second processing unit and most frequently used by the first processing unit to the first processing unit.

6. The method of claim 5, wherein the parity groups in the first and second data structures are organized into first and second sections, wherein prior to processing the first and second data structures, performing the steps of transmitting with the first processing unit the first section of the first data structure to the second processing unit and transmitting with the second processing unit the first section of the second data structure to the first processing unit and wherein the step of processing the first and second data structures further comprises:

determining, with the first processing unit, those parity groups in the second section of the first data structure that are in the first section of the second data structure, wherein such determined parity groups are those parity groups least frequently used by the first processing unit and most frequently used by the second processing unit; and determining, with the second processing unit, those parity groups in the second section of the second data structure that are in the first section of the first data structure, wherein such determined parity groups are those parity groups least frequently used by the second processing unit and most frequently used by the first processing unit.

7. The method of claim 6, wherein a parity group in the first section having a lowest number of update requests has more update requests than a parity group in the second section having a greatest number of update requests.

8. The method of claim 1, wherein the first processing unit is associated with a first cache and the second processing unit is associated with a second cache, wherein the step of writing, with the first processing unit, the data update to the data block comprises the steps of storing a plurality of data updates in the first cache and destaging the plurality of data updates from the first cache to the first storage device, and further performing the steps of:

receiving a read request at the first processing unit for the data at the data block;

determining, with the first processing unit, whether the first processing unit controls access to the parity group;

processing the read request, with the first processing unit, after determining that the first processing unit controls access thereto by performing the steps of reading the data from the data block and storing the read data in the first cache after reading the data;

processing the read request, with the second processing unit, after determining that the second processing unit controls access thereto by performing the steps of transmitting, with the first processing unit, the read request to the second processing unit and storing, with the second processing unit, the read data in the second cache after reading the data; and returning the read data to the request.

9. A system for updating data, comprising (a) a first storage device including data at a data block;

(b) a second storage device including parity data for the data block, wherein a parity group is comprised of the data block and corresponding parity data;

(c) a first processing unit;

(d) a second processing unit;

(e) program logic executed by the first processing unit, including:

(i) means for receiving a data update to the data block in the first storage device;

(ii) means for determining whether the first processing unit controls access to the parity group;

(iii) means for transmitting the data update to the second processing unit after determining that the first processing unit does not control access to the parity group; and (iv) means for performing an update after determining that the first processing unit controls access to the parity group; and (f) program logic executed by the second processing unit, including means for performing an update after receiving the data update from the first processing unit.

10. The system of claim 9, wherein the program logic executed by the first processing further includes means for sending a first message to the second processing unit indicating the parity group to be updated after receiving the update and means for sending a second message to the second processing unit indicating that the parity group was updated after writing the data update to the data block and the new parity data to the second storage device and wherein the program logic executed by the second processing unit further includes means for processing at least one of the first message and the second message to determine the parity groups not updated if the first processing unit fails.

11. The system of claim 9, wherein the first processing unit controls access to a first set of parity groups and the second processing unit controls access to a second set of parity groups, further comprising:

at least one memory device comprising a first data structure that indicates a frequency of updates to the parity groups by the first processing unit and a second data structure that indicates a frequency of updates to the parity groups by the second processing unit;

wherein the program logic executed by the first processing unit further comprises:
  (i) means for processing the first and second data structures to determine those parity groups least frequently used by the first processing unit and most frequently used by the second processing unit; and
  (ii) means for reassigning control of parity groups that the first processing unit controls that are determined to be least frequently used by the first processing unit and most frequently used by the second processing unit to the second processing unit; and wherein the program logic executed by the second processing unit further comprises:
  (i) means for processing the first and second data structures to determine those parity groups least frequently used by the second processing unit and most frequently used by the first processing unit; and
  (ii) means for reassigning control of parity groups that the second processing unit controls that are determined to be least frequently used by the second processing unit and most frequently used by the first processing unit to the first processing unit.

12. The system of claim 9, further comprising:

a first cache associated with the first processing unit, wherein the first processing unit writes the data update to the data block by storing a plurality of data updates in the first cache and writing the plurality of data updates from the first cache to the first storage device, wherein the program logic executed by the first processing unit further includes:
  (i) means for receiving a read request for the data at the data block;
  (ii) means for determining whether the first processing unit controls access to the parity group;
  (iii) means for reading the data from the data block after determining that the first processing unit control access thereto;
  (iv) means for storing the read data in the first cache after reading the data; and
  (v) means for transmitting the read request to the second processing unit after determining that the first processing unit does not control access thereto;

a second cache associated with the second processing unit, wherein the program logic executed by the second processing unit comprises means for storing the read data in the second cache after reading the data; and returning the read data to the request.

13. An article of manufacture for use in programming a first processing unit and a second processing unit to update data at a data block in a first storage device with a data update, wherein parity data for the data block is maintained in a second storage device, wherein a parity group is comprised of a data block and corresponding parity data, the article of manufacture comprising at least one computer readable storage device including at least one computer program embedded therein that causes the first and second processing units to perform the steps of:

receiving, with a first processing unit, a data update to the data block;
  determining, with the first processing unit, whether the first processing unit controls access to the parity group;
  transmitting, with the first processing unit, the data update to a second processing unit after determining that the first processing unit does not control access to the parity group;

performing an update, with the second processing unit, after receiving the data update from the first processing unit; and performing an update, with the first processing unit, after determining that the first processing unit controls access to the parity group.

14. The article of manufacture of claim 13, wherein the step of performing an update comprises the steps of:

indicating that the processing unit that does not control access to the parity group cannot access the parity group;

reading the current data at the data block and the parity data for the data block;

determining new parity data from the data update, the data at the data block, and the parity data; and writing the data update to the data block in the first storage device and the new parity data to the second storage device.

15. The article of manufacture of claim 13, wherein the step of determining whether the first processing unit controls access to the parity group comprises the first processing unit performing one of the operations that is a member of the set of operations comprising:

processing a data structure indicating an assignment of control of parity groups to the first processing unit;

processing microcode providing an assignment of control of parity groups to the first processing unit; and processing an algorithm to compute the parity groups that the first processing unit controls.

16. The article of manufacture of claim 13, wherein the step of the first processing unit performing an update further comprises the steps of:

sending a first message to the second processing unit indicating the parity group to be updated after receiving the update;

sending a second message to the second processing unit indicating that the parity group was updated after writing the data update to the data block and the new parity data to the second storage device; and processing, with the second processing unit, at least one of the first message and the second message to determine the parity groups not updated if the first processing unit fails.

17. The article of manufacture of claim 13, wherein the first processing unit controls access to a first set of parity groups and the second processing unit controls access to a second set of parity groups, wherein a first data structure indicates a frequency of updates to the parity groups by the first processing unit and a second data structure indicates a frequency of updates to the parity groups by the second processing unit, further comprising the steps of:

processing the first and second data structures to determine those parity groups least frequently used by the first processing unit and most frequently used by the second processing unit;

processing the first and second data structures to determine those parity groups least frequently used by the second processing unit and most frequently used by the first processing unit;

reassigning control of parity groups that the first processing unit controls that are determined to be least frequently used by the first processing unit and most frequently used by the second processing unit to the second processing unit; and reassigning control of parity groups that the second processing unit controls that are determined to be least frequently used by the second processing unit and most frequently used by the first processing unit to the first processing unit.

18. The article of manufacture of claim 17, wherein the parity groups in the first and second data structures are organized into first and second sections, wherein prior to processing the first and second data structures, performing the steps of transmitting with the first processing unit the first section of the first data structure to the second processing unit and transmitting with the second processing unit the first section of the second data structure to the first processing unit and wherein the step of processing the first and second data structures further comprises: determining, with the first processing unit, those parity groups in the second section of the first data structure that are in the first section of the second data structure, wherein such determined parity groups are those parity groups least frequently used by the first processing unit and most frequently used by the second processing unit; and determining, with the second processing unit, those parity groups in the second section of the second data structure that are in the first section of the first data structure, wherein such determined parity groups are those parity groups least frequently used by the second processing unit and most frequently used by the first processing unit.

19. The article of manufacture of claim 18, wherein a parity group in the first section having a lowest number of update requests has more update requests than a parity group in the second section having a greatest number of update requests.

20. The article of manufacture of claim 13, wherein the first processing unit is associated with a first cache and the second processing unit is associated with a second cache, wherein the step of writing, with the first processing unit, the data update to the data block comprises the steps of storing a plurality of data updates in the first cache and destaging the plurality of data updates from the first cache to the first storage device, and further performing the steps of:

receiving a read request at the first processing unit for the data at the data block;

determining, with the first processing unit, whether the first processing unit controls access to the parity group;

processing the read request, with the first processing unit, after determining that the first processing unit controls access thereto by performing the steps of reading the data from the data block and storing the read data in the first cache after reading the data;

processing the read request, with the second processing unit, after determining that the second processing unit controls access thereto by performing the steps of transmitting, with the first processing unit, the read request to the second processing unit and storing, with the second processing unit, the read data in the second cache after reading the data; and returning the read data to the request.

21. A memory for storing data for access by a first processing unit composing lock ownership data indicating parity groups controlled by the first processing unit, wherein a parity group is comprised of a data block and parity data for the data block, wherein the first processing unit processes the lock ownership data to determine whether the first processing unit controls access to the parity group after receiving update data to a data block in the parity group, wherein the first processing unit transmits the data update to the second processing unit to perform the update after determining that the first processing unit does not control access thereto; and wherein the first processing performs the update after determining that the first processing unit controls access to the parity group.

22. The memory device of claim 21, wherein the memory device is a first memory device, further including a first data structure indicating a number of update requests performed by the first processing unit to the parity groups, further comprising:

a second memory device comprising a second data structure indicating a number of update requests performed by the second processing unit to the parity groups, wherein the first processing unit processes the first and second data structures to determine those parity groups least frequently used by the first processing unit and most frequently used by the second processing unit, wherein the second processing unit processes the first and second data structures to determine those parity groups least frequently used by the second processing unit and most frequently used by the first processing unit.

23. The memory device of claim 22, wherein the first processing unit reassigns control of parity groups that the first processing unit controls that are determined to be least frequently used by the first processing unit and most frequently used by the second processing unit to the second processing unit and wherein the second processing unit reassigns control of parity groups that the second processing unit controls that are determined to be least frequently used by the second processing unit and most frequently used by the first processing unit to the first processing unit.

24. The first and second memory devices of claim 23, wherein the the parity groups in the first and second data structures are organized into first and second sections, wherein the first processing unit transmits the first section of the first data structure to the second processing unit and the second processing unit transmits the first section of the second data structure to the first processing unit, wherein the parity groups determined by the first processing unit are those parity groups in the second section of the first data structure that are in the first section of the second data structure and wherein the parity groups determined by the second processing unit are those parity groups in the second section of the second data structure that are in the first section of the first data structure.

25. The memory devices of claim 24, wherein a parity group in the first section having a lowest number of update requests has more update requests than a parity group in a second section having a greatest number of update requests.

* * * * *